United States Patent
Hatanaka

(10) Patent No.: US 6,170,593 B1
(45) Date of Patent: Jan. 9, 2001

(54) HOUSING DEVICE OF MOTORCYCLE

(75) Inventor: Akimasa Hatanaka, Hamamatsu (JP)

(73) Assignee: Suzuki Kabushiki Kaisha, Hamamatsu (JP)

( * ) Notice: Under 35 U.S.C. 154(b), the term of this patent shall be extended for 0 days.

(21) Appl. No.: 09/427,080

(22) Filed: Oct. 26, 1999

(30) Foreign Application Priority Data

Oct. 27, 1998 (JP) .................................................. 10-306004

(51) Int. Cl.[7] .................................................. B62D 61/02
(52) U.S. Cl. ........................ 180/219; 280/304.5; 224/413
(58) Field of Search ........................ 180/219; 280/304.5; 224/413, 419, 425, 426, 433; D12/409, 410; 296/37.1

(56) References Cited

U.S. PATENT DOCUMENTS

| | | | |
|---|---|---|---|
| 4,280,582 | * 7/1981 | Kouyama et al. | 180/219 |
| 4,830,134 | * 5/1989 | Hashimoto | 180/219 |
| 4,915,188 | * 4/1990 | Ota et al. | 180/219 |
| 5,228,536 | * 7/1993 | Mohns | 180/219 |
| 5,433,286 | * 7/1995 | Kumamaru et al. | 180/219 |
| 5,671,622 | 9/1997 | Yamada et al. . | |
| 6,073,719 | * 6/2000 | Ohmika et al. | 180/219 |

FOREIGN PATENT DOCUMENTS

| | | | |
|---|---|---|---|
| 0 726 195 | 8/1996 | (EP) . | |
| 285478 | * 11/1989 | (JP) | 180/219 |
| 311975 | * 11/1989 | (JP) | 180/219 |
| 5-8775 | 1/1993 | (JP) . | |

* cited by examiner

Primary Examiner—Daniel G. DePumpo
(74) Attorney, Agent, or Firm—Oblon, Spivak, McClelland, Maier & Neustadt, P.C.

(57) ABSTRACT

A motorcycle is generally provided with a lateral pair of frame bodies, a pivot shaft connected between the frame bodies, a swing arm mechanism supported to the pivot shaft to be swingable and adapted to support a rear wheel. A housing box for accommodating articles is disposed below a seat, and the housing box is composed of an upper portion and a lower extension portion which extends vertically downward so as to pass through a space of the swing arm mechanism between the pivot shaft and the rear wheel in an installed state of the motorcycle.

5 Claims, 6 Drawing Sheets

HOUSING DEVICE OF MOTORCYCLE

BACKGROUND OF THE INVENTION

The present invention relates to an article housing device of a motorcycle disposed under a seat and adapted to house a long article such as a U-shaped lock device.

A U-shaped lock device commercially available as a lock device for preventing a motorcycle from being stolen is widespread because it is very strong as compared with a chain lock, a wire lock, or the like. However, because the U-shaped lock device can not be folded into a compact size unlike the chain lock, the wire lock, or the like, the U-shaped lock device is difficult to be housed in a housing device having a small capacity and provided under a seat of the motorcycle. A conventional example of a structure for housing the U-shaped lock device under the seat is disclosed in Japanese Patent Laid-Open Publication No. HEI 7-89472, for example.

Although the structure of the conventional example is suitable to a road sports type of motorcycle in which a position of the seat is relatively high and a front-to-rear (longitudinal) length of the seat is large, the structure is difficult to be applied to an American type of motorcycle, for example, in which the position of the seat is low and the front-to-rear length thereof is short because a thickness of a cushion of the seat can not be increased and a body layout is severely limited. Moreover, the above structure of the conventional example is for housing only a U-shaped lock device and can not house other types of long articles such as a collapsible umbrella.

SUMMARY OF THE INVENTION

An object of the present invention is to substantially eliminate defects or drawbacks encountered in the prior art mentioned above and to provide a housing device, for accommodating articles, of a motorcycle which can comfortably house a long-size article such as U-shaped lock device without being affected by a height and a length of a seat, a body layout, or the like and without affecting a swing arm supporting a rear wheel.

This and other objects can be achieved according to the present invention by providing a housing device, for accommodating articles, of a motorcycle which comprises a lateral pair of frame bodies, a pivot shaft connected between the frame bodies, a swing arm supported to be swingable to the pivot shaft and supporting a rear wheel and in which a housing box is disposed below a seat, the housing box being composed of an upper portion and a lower extension portion which extends vertically downward so as to pass through a space of the swing arm between the pivot shaft and the rear wheel in an installed state of the motorcycle.

In a preferred embodiment, the housing box has a size decreased downward as viewed from a side of the automobile in an installed state and has a decreased size portion of the housing box passes through the space of the swing arm.

The swing arm is provided with a lateral pair of arm members extending both lateral sides of a body of the motorcycle, a bridge member is disposed so as to connect the arm members and the pivot shaft connects both the arm members so as to define a space between the pivot shaft and the bridge member through which the lower extension portion of the housing box passes.

The lower extension portion of the housing box has a longitudinal length and a width length which is larger than the longitudinal length.

At least an uppermost portion and a lowermost portion of the housing box is provided with fixing portions for fixing the housing box to the body of the motorcycle body.

According to the the housing device of the motorcycle of the structure mentioned above, since the housing box disposed under the seat extends downward such that the housing box has a portion vertically passing through the swing arm supporting the rear wheel between the pivot shaft and the rear wheel, the vertical length of the housing box can be increased satisfactory and, accordingly, the long article such as U-shaped lock device can be housed comfortably without being affected by the height and the length of the seat, the body layout or the like.

Furthermore, the size of the housing box decreases downward when the housing box is viewed from the side, the longitudinal length of the portion of the housing box is smaller in size than the width of that portion, and only the smaller portion passes through the swing arm, so that the housing box can pass through the swing arm without affecting the swing arm and, accordingly, the long article can be housed.

Still furthermore, since the housing device is fixed to the motorcycle body at at least uppermost portion and the lowermost portion, the housing box vertically extending can be firmly mounted to the body.

The nature and further characteristic features of the present invention will be made clear in the following descriptions with reference to the accompanying drawings.

DESCRIPTION OF THE PREFERRED EMBODIMENTS

Figure 1:
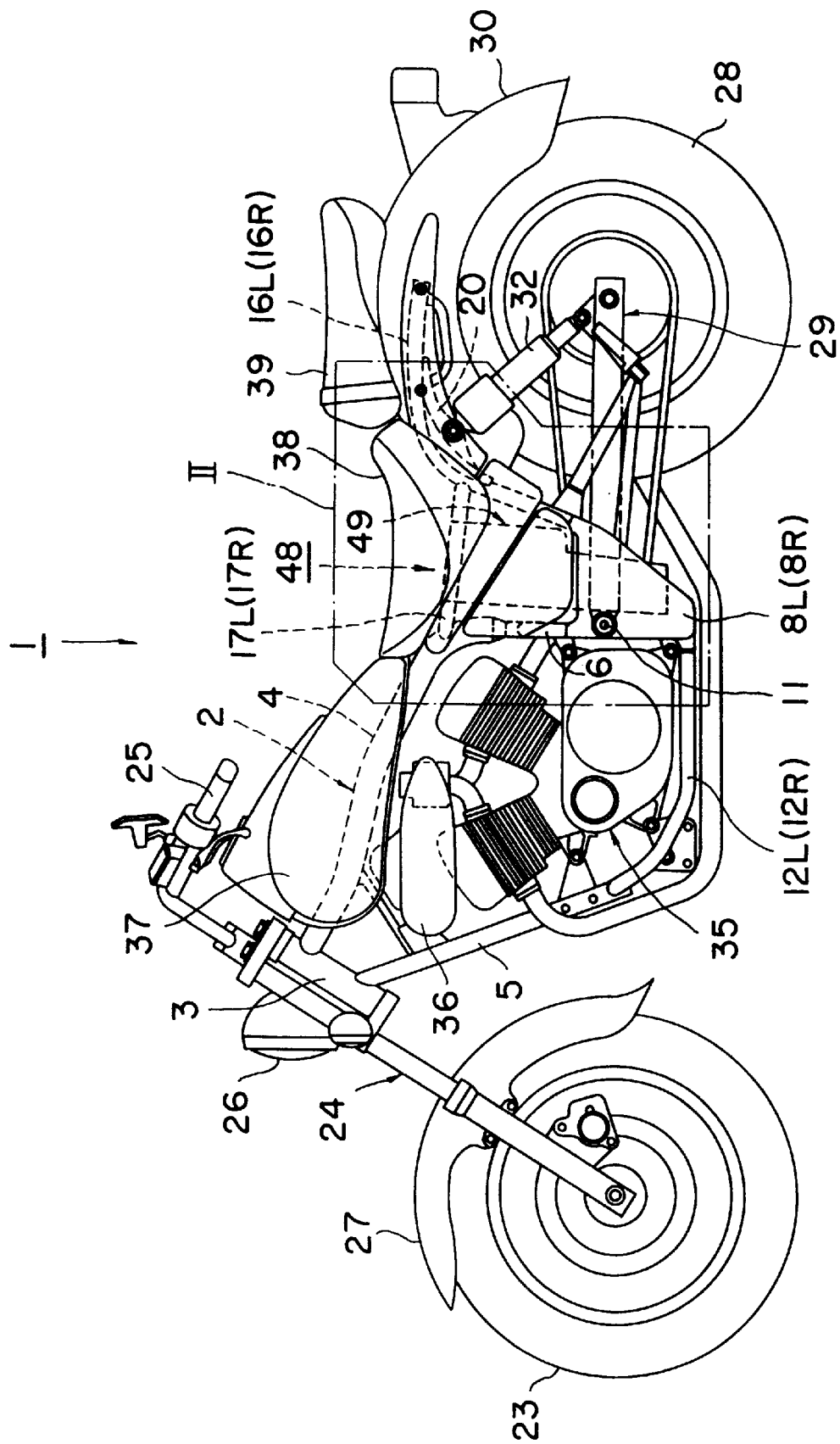
FIG. 1 is a left side view of an example of a motorcycle to which an embodiment of a housing device according to the present invention is applied.

An embodiment of the present invention will be described hereunder with reference to the accompanying drawings. FIG. 1 is a left side view of an example of a motorcycle to which the embodiment of the housing device according to the present invention is applied. The motorcycle is of an American type in which a position of a handle-bar is high and a position of a seat is low.

A body frame 2 of the motorcycle 1 comprises a thick main pipe 4 and a thin down pipe 5 extending from a head pipe 3 provided to a front head portion rearward and diagonally downward. As shown in FIGS. 2 to 4 and 6, a rear end of the main pipe 4 is curved downward to be fixed to a center portion of a center pipe 6 extending in a width direction of the vehicle together with a reinforcing member 7 and left and right opposite ends of the center pipe 6 are curved downward to be connected to upper portions of a pair of left and right frame bodies 8L and 8R.

Figure 5:
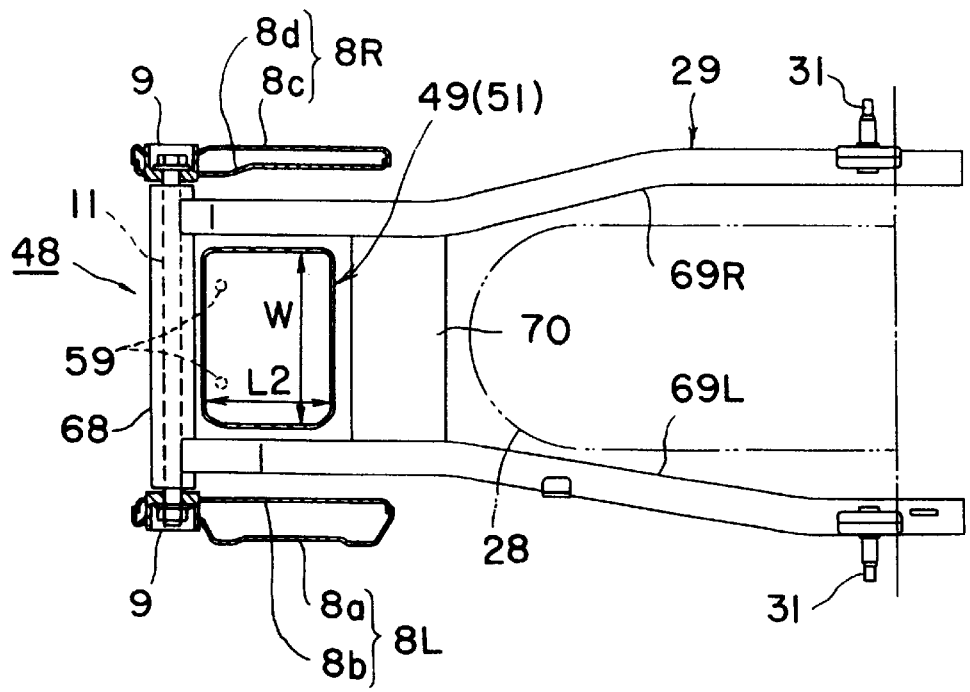
FIG. 5 is a cross-sectional view taken along a line V—V in FIG. 2.

As shown in FIG. 5, the left and right frame bodies 8L and 8R are hollow structures, in which body members 8a and 8b, 8c and 8d formed by press molding a metal sheet material are secured to each other with open ends of the body members 8a and 8b, 8c and 8d facing each other. A pivot boss 9 is fixedly mounted to each of the frame bodies 8L and 8R, and a pivot shaft 11 bridges the respective pivot bosses 9. On the other hand, a pair of left and right side pipes 12L and 12R are extending rearward from a lower end of the down pipe 5 and rear ends of the side pipes 12L and 12R are connected to the frame bodies 8L and 8R. Lower portions of the left and right frame bodies 8L and 8R are connected by a bridge pipe 13, and a lower bracket 14 extending rearward is fixed to the bridge pipe 13.

A pair of left and right seat stays 16L and 16R extend upward from the rear portions of the frame bodies 8L and 8R and curve rearward. Rear ends of a pair of left and right seat pipes 17L and 17R extending rearward from portions of the main pipe 4 near a curved portion of the main pipe 4 are respectively fixed to portions of the seat stays 16L and 16R near the curved portions of the seat stays 16L and 16R. The rear ends of the left and right seat pipes 17L and 17R are connected by a bridge plate 18. Seat bases 19 are secured to intermediate portions of the respective seat pipes 17L and 17R and cushion brackets 20 are respectively secured to curved portions of the seat stays 16L and 16R.

Front forks 24 for supporting a front wheel 23 are axially supported to be bilaterally rotatable (pivotal) by the head pipe 3 of the body frame 2 together with the handle-bar 25, a head light 26, a front fender 27, and the like. On the other hand, a swing arm 29 for supporting a rear wheel 28 is axially supported to be rotatable (pivotal) upward and downward by the pivot shaft 11 which bridges the left and right frame bodies 8L and 8R, and a rear fender 30 covering an upper portion of the rear wheel 28 is fixed to the seat stays 16L and 16R. Cushion units 32 are connected between cushion brackets 20 of the body frame 2 and cushion rods 31 (see FIG. 5) provided to a rear end of the swing arm 29 so as to cushion and restore upward and downward movements of the swing arm 29.

A V-type-two-cylinder engine 35 is mounted to a front half portion of the body frame 2, an air cleaner 36 is mounted above the engine 35, and a fuel tank 37 is disposed astride the main pipe 4. The seat 38 is placed on the seat pipes 17L and 17R and a pillion seat 39 is placed on rear half portions of the seat stays 16L and 16R.

Figure 2:
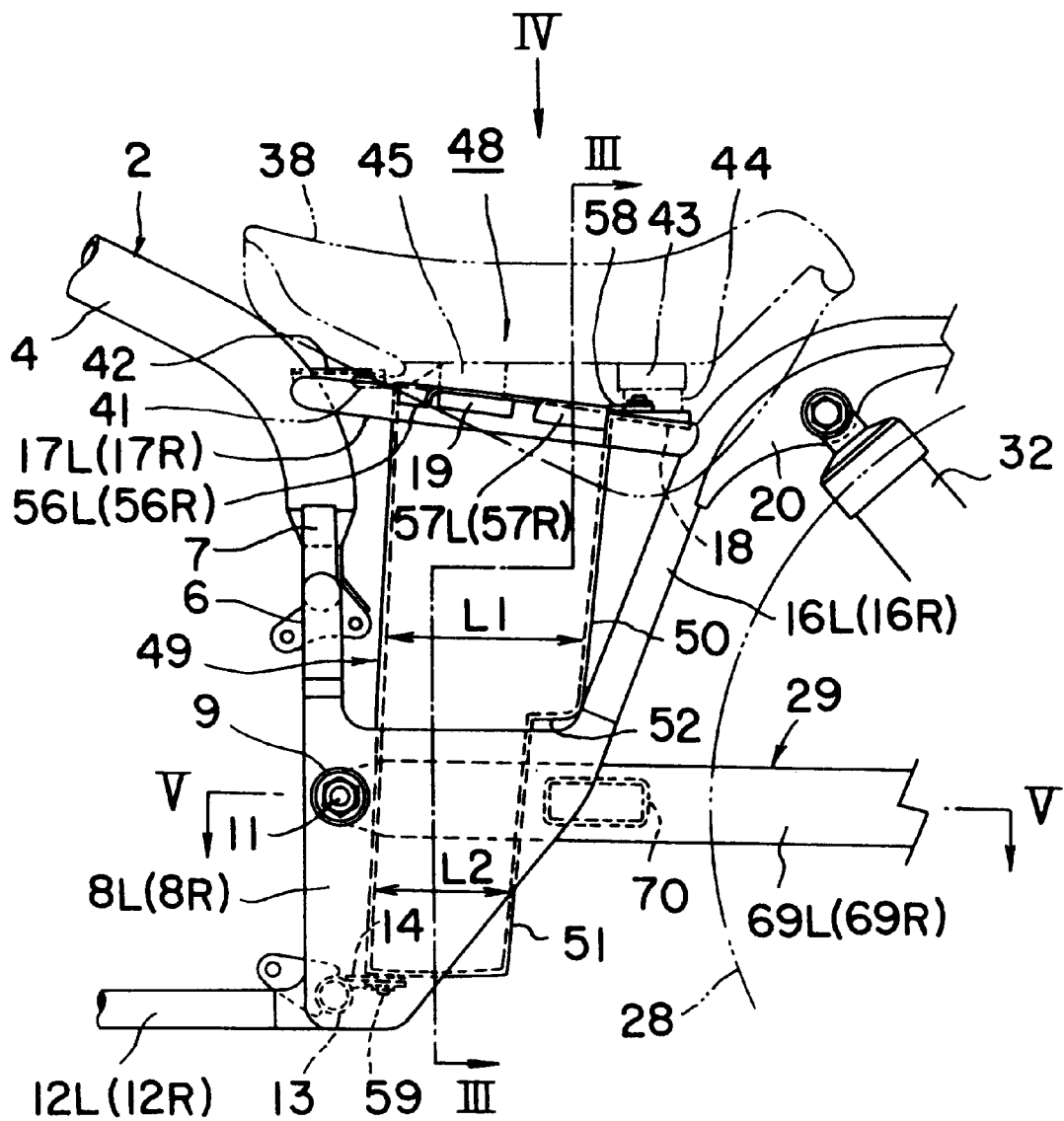
FIG. 2 is an enlarged view of a portion II in FIG. 1 and showing the embodiment of the present invention.

As shown in FIG. 2, a locking hook 41 provided to a lower face of a front portion of the seat 38 is inserted from the rear side into a holder plate 42 provided to the curved portion of the main pipe 4 so as to lock the seat 38. A lock member 43 provided to a lower face of a rear portion of the seat 38 is fixed to a lock mechanism 44 fixed to an upper face of the bridge plate 18, and a cushion member 45 provided to a lower face of an intermediate portion of the seat 38 is placed on the seat bases 19 of the seat pipes 17L and 17R. The seat 38 can be detached by unlocking the lock mechanism 44.

A housing device 48 according to the present invention is provided under the seat 38. A main body of the housing device 48 is a housing box 49. The housing box 49 is integrally formed by molding a synthetic resin material into a deep box shape with its upper portion being opened.

As shown in FIG. 2, the housing box 49, as viewed from a side, is in such a shape that a front-to-rear (longitudinal) length L2 of a lower box portion 51 which substantially occupies a lower half of the housing box 49 is smaller by one step than a front-to-rear (longitudinal) length L1 of an upper box portion 50 which substantially occupies an upper half of the housing box 49. A difference between the front-to-rear lengths L1 and L2 forms a stepped portion 52 on a rear face of the housing box 49. A front face of the housing box 49 is formed into a flat face.

Figure 3:
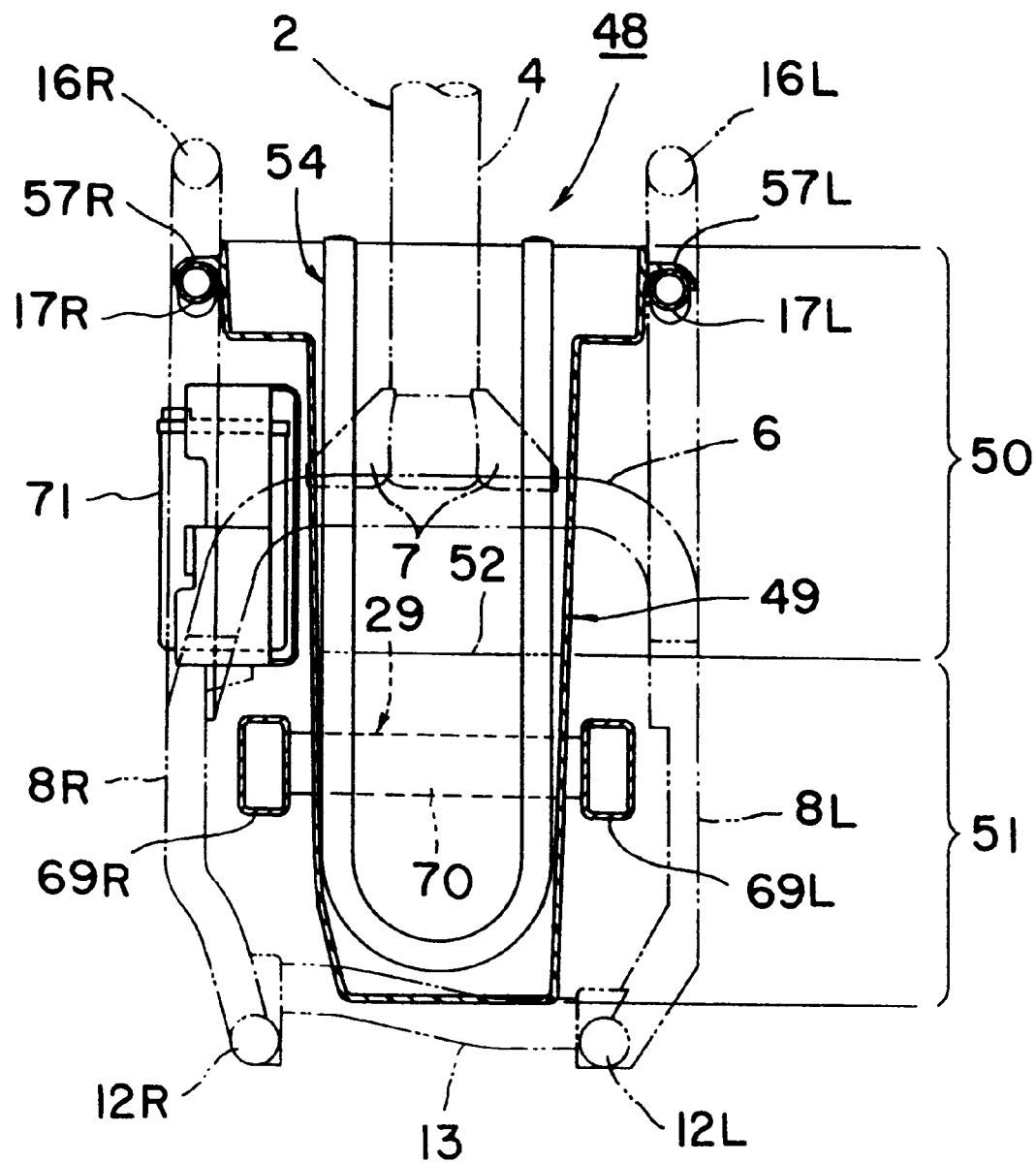
FIG. 3 is a longitudinal sectional view taken along a line III—III in FIG. 2.
Figure 4:
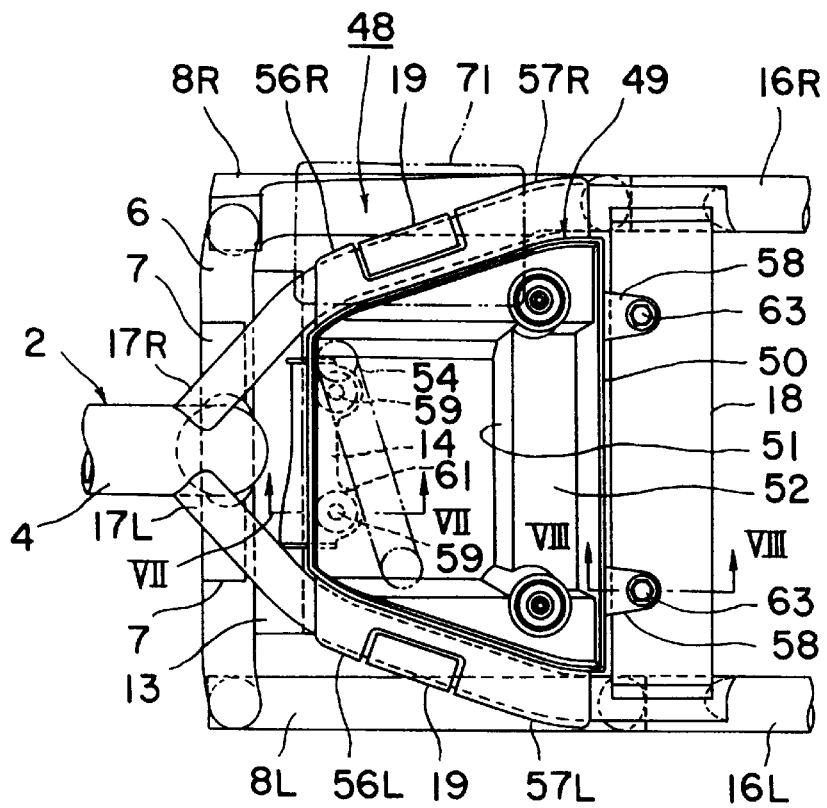
FIG. 4 is a view taken in a direction of an arrow IV in FIG. 2.

As shown in FIG. 5, the front-to-rear length L2 of the lower box portion 51 is smaller than a width (lateral length) W. As shown in FIGS. 3 and 4, the width W is set at such a value that the U-shaped lock device 54 can be housed horizontally. It is also possible to form a stopper or the like for holding the U-shaped lock device 54 on an inner face of the housing box 49 so as to control a movement of the U-shaped lock device 54.

At left and right opposite sides of an uppermost portion of the housing box 49, front and rear pairs of box stoppers 56L, 56R, and 57L, 57R overhanging left and right are formed. A pair of left and right upper portion fixing pieces 58 extending rearward are formed at a rear edge of the uppermost portion of the housing box 49. A pair of left and right lower portion fixing projections 59 extending downward are formed on a front side of a lowermost portion (bottom face) of the housing box 49.

Figure 6:
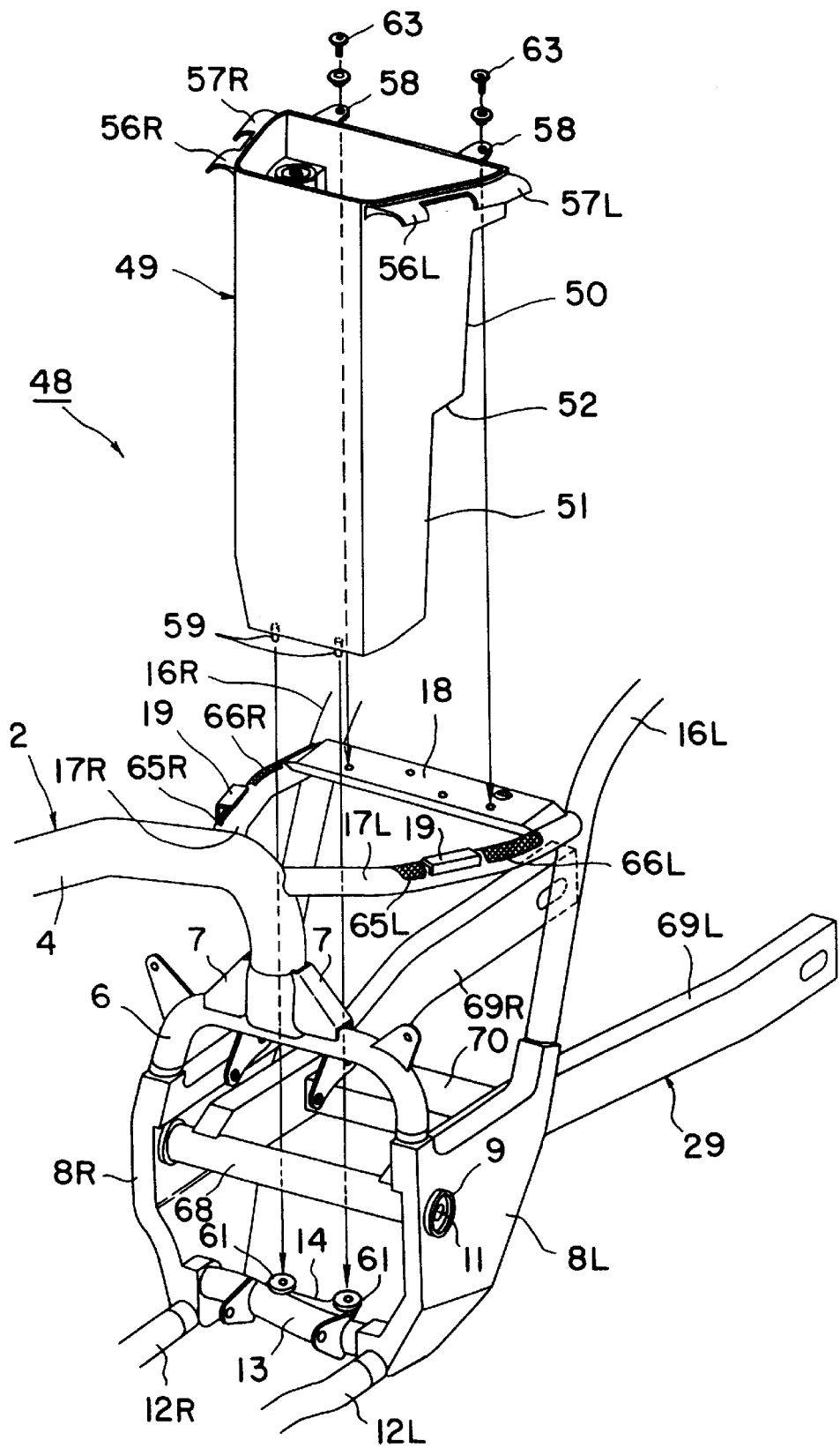
FIG. 6 is an exploded perspective view of the housing device.

As shown in FIG. 6, the housing box 49 is inserted from the upper side through a space between the left and right seat pipes 17L and 17R of the body frame 2 and the bridge plate 18 and between the left and right frame bodies 8L and 8R and is mounted to the vehicle frame 2. As shown in FIGS. 2, 3, and 5, only the lower box portion 51 which is the smaller portion of the housing box 49 vertically passes through the swing arm 29 between the pivot shaft 11 and the rear wheel 28 and extends downward.

Figure 7:
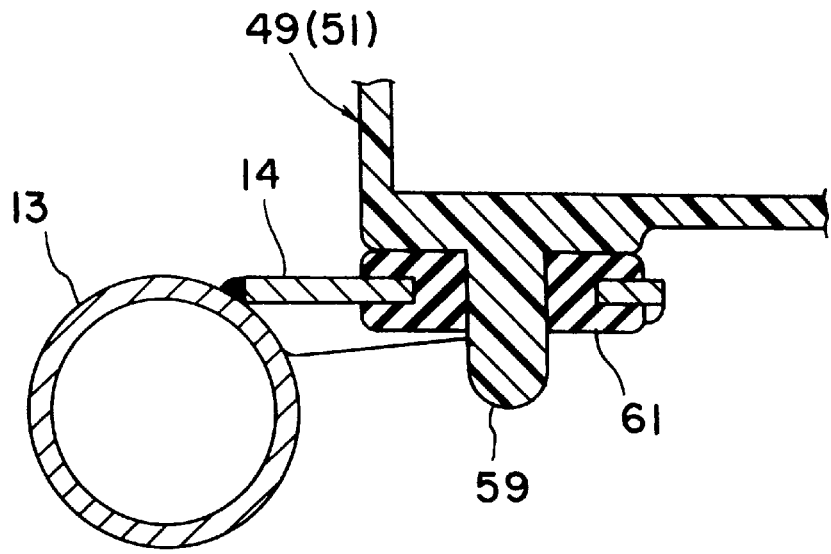
FIG. 7 is a longitudinal cross-sectional view taken along a line VII—VII in FIG. 4.
Figure 8:
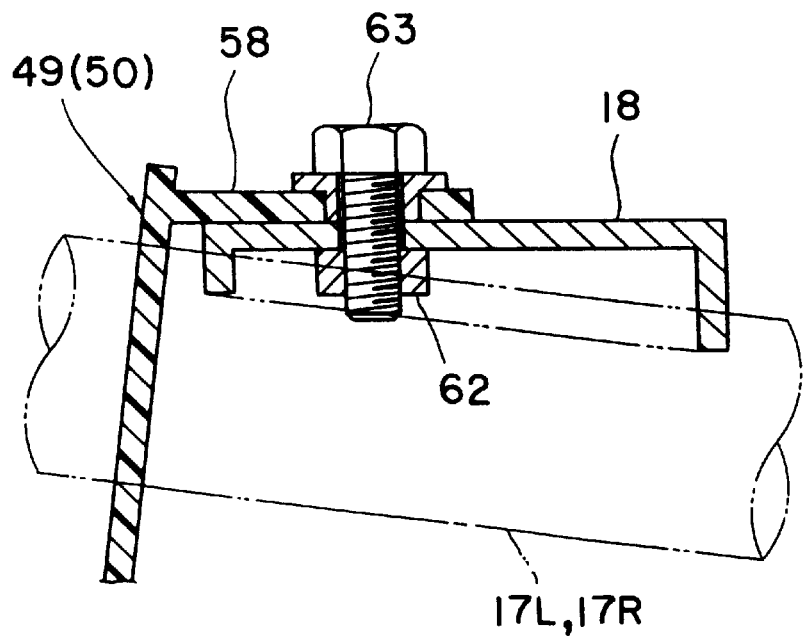
FIG. 8 is a longitudinal cross-sectional view taken along a line VIII—VIII in FIG. 4.

As shown in FIGS. 6 and 7, the lower portion fixing projections 59 of the housing box 49 are inserted into cushion grommets 61 which are resilient and fitted into the lower bracket 14 of the bridge pipe 13, thereby controlling movements in a longitudinal direction and a transverse direction of the lower portion of the housing box 49. The upper portion fixing pieces 58 of the housing box 49 are fastened by screws 63 to nut members 62 secured to a back face of an upper face of the bridge plate 18 as shown in FIG. 8, thereby preventing the entire housing box 49 from coming out upward.

The box stoppers 56L, 56R, 57L, and 57R at the uppermost portion of the housing box 49 are respectively placed on hatched portions 65L, 65R, 66L, and 66R in FIG. 6 on upper faces of the left and right seat pipes 17L and 17R and weight of the entire housing box 49 is relieved to the seat pipes 17L and 17R through the box stoppers 56L, 56R, 57L, and 57R. The seat bases 19 respectively provided to the intermediate portions of the seat pipes 17L and 17R are positioned in advance to be exposed between the front box stoppers 56L and 56R and the rear box stoppers 57L and 57R.

As shown in FIG. 5, the swing arm 29 is assembled by welding a pivot pipe 68 through which the pivot shaft 11 is inserted, a pair of left and right arm members 69L and 69R, and a bridge member 70 for connecting the left and right arm members 69L and 69R at the rear of the pivot pipe 68 to each other and the lower box portion 51 of the housing box 49 vertically passes through a rectangular space surrounded by the members 68, 69L, 69R, and 70.

The stepped portion 52 on the rear face of the housing box 49 is disposed at a slightly upper position than the bridge member 70 of the swing arm 29 (see FIG. 2). As a result, the bridge member 70 does not interfere with the housing box 49 when the swing arm 29 rotates upward and downward about the pivot shaft 11. A battery 71 is disposed at a right side portion of the housing box 49, for example (see FIGS. 3 and 4).

In the housing device 48 with the above structure, the seat 38 is detached to put or take articles into or out of the housing box 49. It is also possible to provide a special lid member to an opening portion at the upper portion of the housing box 49.

With the housing device 48, since the housing box 49 is located so as to vertically pass through the swing arm 29, a vertical length of the housing box 49 can be increased satisfactory without decreasing a thickness of a cushion of the seat 38 even if the vehicle is of an American type in which the position of the seat 38 is low and the length of the seat 38 is small. As a result, the long article such as the U-shaped lock device 54 and the collapsible umbrella can be housed suitably without being affected by the body layout or the like.

Moreover, the housing box 49 is formed into such a shape that the front-to-rear length L2 of the lower box portion 51 is smaller by one step than the front-to-rear length L1 of the upper box portion 50 and the length L2 is smaller than the width W of the lower box portion 51 such that only the lower box portion 51 can vertically pass through a portion between the pivot pipe 68 and the bridge member 70 of the swing arm 29.

As a result, it is possible to keep short a length of the swing arm 29 from the pivot shaft 11 to the rear wheel 28 to prevent an increase in a wheel base of the motorcycle 1 and it is possible to keep large a thickness of the bridge member 70 of the swing arm 29 to avoid a reduction in rigidity of the swing arm 29. Therefore, the long article such as the U-shaped lock device 54 can be housed without affecting the swing arm 29. Furthermore, since the front-to-rear length L1 of the upper box portion 50 is larger than the front-to-rear length L2 of the lower box portion 51, not only the long and narrow article but also an article in a relatively large size can be easily housed in the housing box 49.

Furthermore, since the housing box 49 has the structure in which the upper portion fixing pieces 58 provided to the uppermost portion of the housing box 49 and the lower portion fixing projections 59 provided to the lowermost portion of the housing box 49 are respectively fixed to the bridge plate 18 and the lower bracket 14 of the body frame 2, the housing box 49 vertically extending can be mounted firmly to the body frame 2 and the housing box 49 can be prevented from wobbling even when a heavy article is housed in the housing box 49.

Although the housing box 49 is directly fixed to the body frame 2 in the embodiment, the upper fixing pieces 58, the lower fixing projections 59, or other fixing portions of the housing box 49 may be fixed to a member constituting the vehicle other than the body frame 2. The housing box 49 may not be formed as a single part but may be formed integrally with other parts such as the rear fender 30, side covers, or the like.

Although the swing arm 29 comprises the pivot pipe 68, the pair of left and right arm members 69L and 69R, and the bridge member 70 in the embodiment, the lower portion of the housing box 49 can vertically pass through a space of the swing arm between the pivot shaft 11 and the rear wheel 28 even if the swing arm 29 is of a type without the pivot pipe 68 in which front ends of the left and right arm members 69L and 69R are directly and axially supported by the pivot shaft 11 or of a type for cantilevering the rear wheel 28.

It is to be noted that the present invention is not limited to the described embodiment and many other changes and modifications may be made without departing from the scopes of the appended claims.

What is claimed is:

1. A housing device in combination with a motorcycle, said combination comprising: a pair of frame bodies, a pivot shaft connected between the frame bodies and a swing arm mechanism supported to be swingable to the pivot shaft and supporting a rear wheel and in which a housing box is disposed below a seat, wherein said housing box is composed of an upper portion and a lower extension portion which extends vertically downward so as to pass through a space of the swing arm mechanism between the pivot shaft and the rear wheel in an installed state on the motorcycle.

2. A housing device of a motorcycle according to claim 1, wherein said lower portion has a decreased size portion, relative to said upper portion, as viewed from a side of the motorcycle in an installed state and said decreased size portion of the housing box passes through said space of the swing arm mechanism.

3. A housing device of a motorcycle according to claim 2, wherein said swing arm mechanism is provided with a lateral pair of arm members extending along both lateral sides of a body of the motorcycle, a bridge member is disposed so as to connect the arm members and said pivot shaft connects both the arm members so as to define a space between the pivot shaft and the bridge member through which the lower extension portion of the housing box passes.

4. A housing device of a motorcycle according to claim 1, wherein said lower extension portion of the housing box has a longitudinal length and a width, wherein said width is larger than the longitudinal length.

5. A housing device of a motorcycle according to claim 1, wherein at least an uppermost portion and a lowermost portion of the housing box is provided with fixing portions for fixing the housing box to the body of the motorcycle.

* * * * *